(12) United States Patent
Reuter

(10) Patent No.: US 6,428,583 B1
(45) Date of Patent: Aug. 6, 2002

(54) SEPARATION PROCESS

(75) Inventor: Karl Reuter, Freiburg (DE)

(73) Assignee: Reuter Chemische Apparatebau KG (DE)

( * ) Notice: Subject to any disclaimer, the term of this patent is extended or adjusted under 35 U.S.C. 154(b) by 0 days.

(21) Appl. No.: 09/486,917

(22) PCT Filed: Sep. 2, 1998

(86) PCT No.: PCT/EP98/05561

§ 371 (c)(1),
(2), (4) Date: Apr. 27, 2000

(87) PCT Pub. No.: WO99/12623

PCT Pub. Date: Mar. 18, 1999

(30) Foreign Application Priority Data

Sep. 6, 1997 (EP) .............................................. 97202746

(51) Int. Cl.⁷ .............................................. C30B 17/00
(52) U.S. Cl. .......................................... 23/301; 23/296
(58) Field of Search ...................... 23/301, 296, 295 R, 23/300, 306; 568/217, 723, 724

(56) References Cited

U.S. PATENT DOCUMENTS 4,591,549 A * 5/1986 Matsuzaka et al. ......... 430/569
5,541,051 A * 7/1996 Verbeeck et al. ........... 430/569
5,543,284 A * 8/1996 Verbeeck ..................... 430/569
5,898,075 A 4/1999 McCague et al.

FOREIGN PATENT DOCUMENTS

| DE | 2135717 | 7/1971 |
| EP | 0 548 028 A1 | 6/1993 |
| GB | 796343 | 6/1958 |
| GB | 1 455 710 | 11/1976 |
| WO | WO 97/32644 | 9/1997 |

* cited by examiner

*Primary Examiner*—Steven P. Griffin
*Assistant Examiner*—Edward M. Johnson
(74) *Attorney, Agent, or Firm*—Burns, Doane, Swecker & Mathis, L.L.P.

(57) ABSTRACT

A crystallization process is described for separating a desired substance from an aggregate mixture in which an emulsion of droplets in a continuous phase containing the aggregate mixture is formed and supersaturated, characterized in that the emulsion is seeded with seed crystals of the desired substance and seed crystals of at least one other substance in the aggregate mixture to effect crystallization of the desired substance and the other substance(s) in the continuous phase. Also described are substances separated by the process, and devices for carrying out the process.

11 Claims, 2 Drawing Sheets

SEPARATION PROCESS

BACKGROUND OF THE INVENTION

The present invention is in the field of crystallisation, more particularly, in the field of crystallisation as a means of separating and purifying chemical substances.

The selective crystallisation of a desired substance from a mixture of substances by emulsion crystallisation is known. In emulsion crystallisation processes, the desired substance is selectively crystallised by forming emulsified droplets of the mixture and then adding a suspension of seed crystals of the desired substance to the emulsion to thereby selectively crystallise that substance, or by cooling the emulsion to induce crystallisation (c.f. EP 0 548 028 A1; Davey et al., Nature, Vol. 375, pp. 664–666 (Jun. 22, 1995); I. Holéci, Chemicky prûmysi 14/39, pp. 638–641 (1964)).

It has now been surprisingly found that the yield of purified component can be dramatically increased by seeding with seed crystals of the desired substance and one or more other substances in the emulsion. The other substance (s) are chosen according to the concentration at which they are present in the mixture and according to their physicochemical characteristics to allow their selective crystallisation and their subsequent removal, as will be described in detail below. By way of the process of the present invention, yields can be dramatically increased. This improvement represents an important advantage in commercial separation processes.

SUMMARY OF THE INVENTION

The present invention provides a crystallisation process for separating a desired substance from an aggregate mixture in which process an emulsion of droplets in a continuous phase containing the aggregate mixture is formed and supersaturated. Supersaturation is achieved by techniques known in the art, such as by disolving an excess amount of aggregate mixture in the emulsion by means of ultrasound or employing elevated temperatures. This process is characterised in that the emulsion is seeded with seed crystals of the desired substance and seed crystals of at least one other substance in the aggregate mixture to effect crystallisation of the desired substance and the other substance(s) in the continuous phase. The present invention also encompasses substances separated by the inventive process, and devices for carrying out the process, as are described hereinafter.

DETAILED DESCRIPTION OF THE INVENTION

Figure 1:
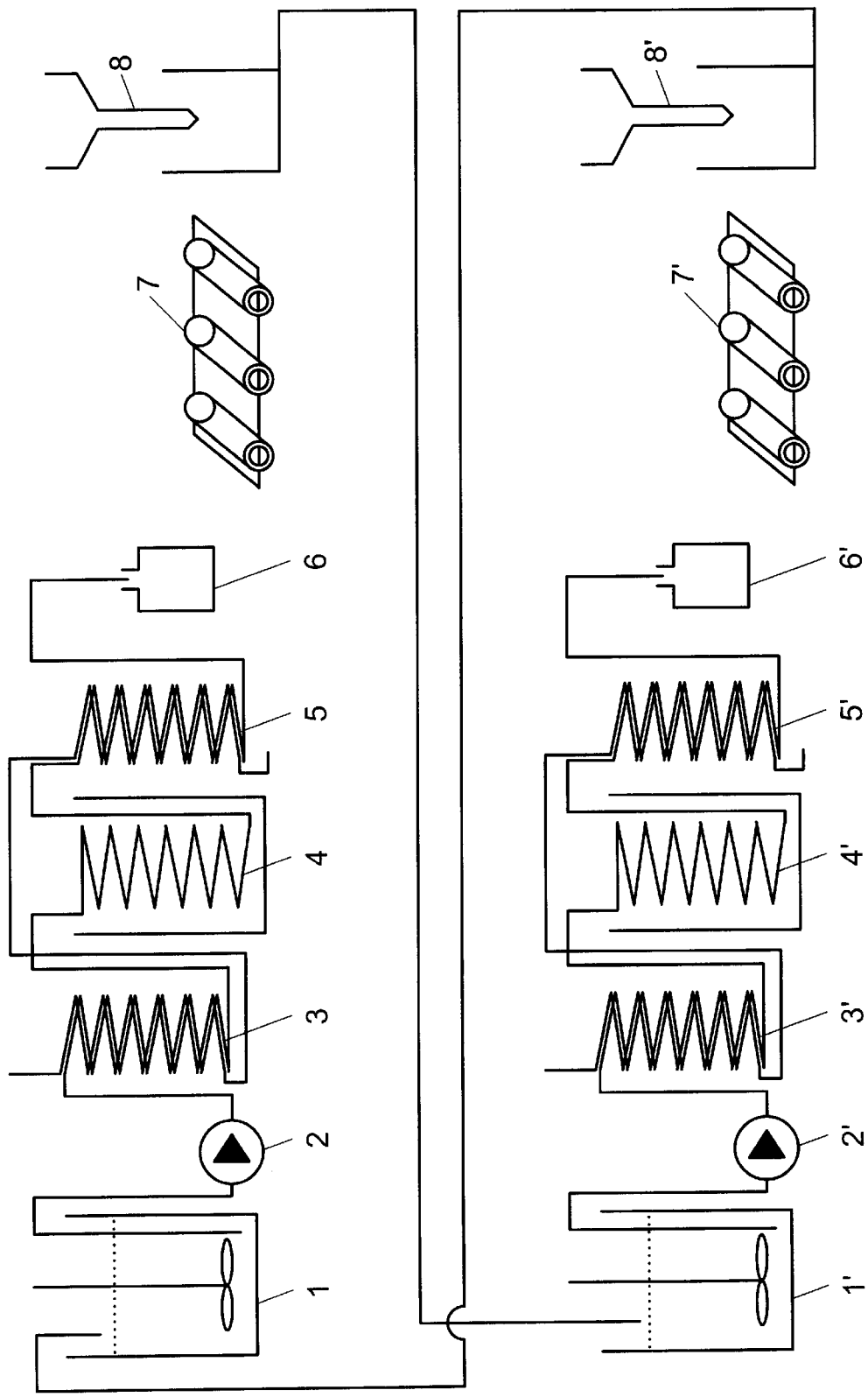
FIG. 1 shows a procedure for carrying out the process of the present invention batch-wise and with consecutive seeding.

As used herein, terms should be understood to have the meanings given.

"Emulsions" are per se known in the art, as are methods for forming them. Emulsions are, by definition, "droplets" dispersed in a "continuous phase". According to the present invention, the emulsion contains an aggregate mixture of substances, at least one of which substances is the "desired" substance, which is sought to be separated from the other substances. The aggregate mixture is present throughout the emulsion, though typically is present mostly in the droplets. Typically, at least 30% by weight of the aggregate mixture is contained in the droplets, more typically, at least 50% by weight.

Accordingly, the droplets of the emulsion will contain the aggregate mixture, and may optionally contain one or more solvents and solvent additives, as are defined below. The droplets typically vary in diameter from less than 500 nm, e.g. 5–200 nm, in which case the droplets are "microdroplets", and the emulsions are "microemulsions", to 0.2–100 $\mu$m, e.g. 0.5–50 $\mu$m, in which case the droplets and emulsions are simply called "droplets" and "emulsions". For the sake of simplicity, the terms "droplets" and "emulsions" as used herein also encompass microdroplets and microemulsions.

"Aggregate mixture" as used herein refers to a mixture containing the desired substance and one or more impurities. The aggregate mixture may be a liquid or a solid, or a liquid and a solid. The aggregate mixture may be optionally dissolved or dispersed in one or more solvents, as described below. Droplets of the aggregate mixture are typically formed with the aid of one or more surfactant(s) and in case of microdroplets typically also with the aid of one or more alcohols, whereby the alcohol may be added externally to the dispersion, or may be contributed by the aggregate mixture itself.

"Desired substance" as used herein, refers to inorganic and organic substances having a melting point above −130° C., preferably above −78° C., more preferably above −20° C. The process of this invention is especially indicated for those substances that have been traditionally difficult to purify, e.g. constitution isomers, stereo isomers (cis/trans isomers, diastereomers, enantiomers etc.) homologues and eutectic mixtures. The desired substance can be a pharmaceutical, an agrochemical, a fragrance, a food additive, a chemical intermediate or the like. There may be more than one desired substance in the aggregate mixture.

For the sake of simplicity the term "desired substance" is used in the singular. However, it should be understood that the aggregate mixture may contain more than one desired substances, all of which can be separated according to the present invention.

The continuous phase and the droplets of the emulsion can contain a wide variety of solvents, and will be chosen according to the solubility characteristics, nucleation characteristics and the selectivity of the crystallisation process for the desired substance. Preferably, the desired substance will be less soluble in the continuous phase than in the droplet.

In such cases where the desired substance is water insoluble or substantially water insoluble, the continuous phase is conveniently polar and hydrophilic.

The continuous phase may further contain an agent for adjusting the solubility of the desired substance in the continuous phase and/or the freezing point of the continuous phase. In such cases where the continuous phase is water, such agent is conveniently a water soluble inorganic salt such as $CaCl_2$, NaCl, KCl, $MgCl_2$ $AlCl_3$, or a water-miscible organic liquid such as an alcohol, ether, ketone, ester, lactone, dimethylsulfoxide (DMSO) and acetonitrile. Water-miscible organic liquids are preferred.

Below is set forth a list of suitable solvents and solvent additives which may be used in the droplets and the continuous phase.

I. Non-polar, lipophilic solvents and additives having a water solubility of ≦5% v/v at room temperature (hereinafter "r.t.") include:

1. Alkanes such as n-, i- or branched of the general formula —($C_nH_{2n+2}$)— including polyethylenes, polypropylenes, cycloalkanes (e.g. cyclopentane, cyclohexane);
2. Alkenes such as n-, i- or branched of the general formula —($C_2H_{2n}$)— including cycloalkenes (cyclohexene, terpene), di- or polyalkenes;
3. Alkines such as n-, i- or branched of the general formula —($C_nH_{2n-2}$)—, cycloalkines, di- or polyalkines;
4. Aromatics such as unsubstituted aromatics (e.g. benzene, naphthalene), substituted aromatics such as alkylated aromatics (e.g. toluene, xylene, higher alkylated benzenes, alkylated naphthalenes), heterosubstituted aromatics such as halogenated (e.g. chlorobenzene, hexafluorobenzene) and/or nitrated (e.g. nitrobenzene), heteroaromatics such as pyridine, furane, thiophene, and polymers such as polystyrene;
5. Mineral-, synthetic-, crop- and/or silicone oils (e.g. Castor oil, methyloleate, polysiloxane);
6. Halogenated hydrocarbons such as $CH_2Cl_2$, $CHCl_3$, $CCl_4$, trichloroethane, trichloroethene, polyvinylchloride;
7. $CS_2$, $CO_2$;
8. Ethers such as n-, i- or branched of the general formula ($C_nH_m$)O($C_xH_y$) with total $C \geq 4$ (e.g. diethylether, tert-butyl methylether (TBME);
9. Aldehydes such as n-, i- or branched of the general formula $C_nH_mCHO$ with total $C \geq 4$.
10. Ketones such as ($C_nH_m$)CO($C_xH_y$) with total $C \geq 6$ (e.g. 2-hexanone, methyl-t-butylketone) or cycloketones with approx. $C \geq 6$;
11. Esters such as n-, i- or branched of the general formula ($C_nH_m$)COO($C_xH_y$) with total $C \geq 5$, diesters such as di(-methyl-, -isodecyl-, -isoundecyl-, -isotridecyl-) phthalate, diesters of carbonic acid, triesters such as oils and fats, and polyesters;
12. Amides such as N-,N-dimethyl laurylamide, and polyamides;
13. Lactames such as (N-octyl-, N-dodecyl-)pyrrolidone;
14. Alkanoles, alkenoles, alkinoles, aromatic and cyclic alcohols such as n-, i-, branched or cyclic of the general formula (1,2, . . . )($C_nH_m$)OH with total $C \geq 5$ (e.g. 2-hexanol, cyclohexanol, benzylalcohol, furfurylalcohol and terpinol);
15. Primary, secondary and tertiary amines e.g. n-, i- or branched of the general formula (1,2, . . . )($C_nH_m$)$NH_2$ with total $C \geq 6$ (e.g. dodecylamine);

II. Amphiphilic solvents, soluble in both non-polar, lipophilic and polar, hydrophilic phases with a water solubility of >5% v/v at r.t. and a solubility of >5% v/v at r.t. in methyloleate include:
1. Ethers such as tetrahydrofurane (THF), polyethers such as dimethoxyethane (DME), dioxane, trioxane, polyethylene glycol (PEG), polypropylene glycol (PPG);
2. Alcohols such as n-,i-, cyclo- or branched of the general formula (1,2, . . . )($C_nH_m$)OH with total $C \leq 5$ (e.g. isopropanol, isobutanol, cyclobutanol, cyclopentanol), aromatic alcohols such as phenol, furfurylalcohol, diols such as propyleneglycol, butanediol, hydroquinone or polyols;
3. Aminoalcohols such as ethanolamine, diethanolamine, triethanolamine;
4. Primary, secondary and tertiary amines such as n-, i- or branched of the general formula (1,2, . . . )($C_nH_m$,$NH_2$ with total $C \leq 7$ (aniline, cyclohexylamine, pyridine, morpholine), polyamines;
5. Aldehydes with total $C \leq 3$ (e.g. formaldehyde, acetaldehyde);
6. Ketones such as n-, i- or branched of the general formula ($C_nH_m$)CO($C_xH_y$) or cyclic ketones with total $C \leq 6$ (acetone, 2-butanone, cyclohexanone);
7. Esters such as n-, i- or branched of the general formula ($C_nH_m$)COO($C_xH_y$) with total $C \leq 4$, di-, triesters ethylenglycoldiacetate, dimethyladipiate, dimethylglutamate, dimethylsuccinate, trimethylphosphate);
8. Lactones such as γ-butyrolactone;
9. Amides such as formamide, dimethyl formamide (DMF), acetamide;
10. Lactames such as (N-methyl-, N-ethyl-, N-isopropyl-, N -hydroxyethyl-) pyrrolidone;
11. Other heterocyclic compounds such as imidazoles, triazoles;
12. Carbon-acids such as n-, i- or branched of the general formula $C_nH_mCOOH$ with total $C \leq 5$.

III Polar, hydrophilic solvents or solvent additives with a solubility of $\leq 5\%$ v/v in methyloleate include:
1. Water;
2. DMSO;
3. Di- or polycarbonic acids (e.g. oxalic acid, tartaric acid);
4. selected di- or polyalcohols (e.g. ethanediol, glycerine, PVA);
5. Amino acids;
6. Sugars.

IV. Chiral solvents and additives including: camphene, menthol, 1,1'-bi-2-naphthol, fenchone, nicotine, ephedrine, 2-amino-1-butanol, mandelic-acid and esters, lactic acid and esters, camphoric acid and esters, camphene-10-sulfonic acid and esters, Mosher's acid, tartaric acid and esters such as mentyl-, dodecyl-, natural and artificial α-amino acids and derivates, sugars and derivates (e.g. vitamin C).

In cases where the emulsion is a microemulsion, typically also one or more alcohols are added to the dispersion. Such alcohols include iso-butanol, 1-butanol, 2-butanol, 2-pentanol, 2-hexanol, 2-octanol, cyclopentanol, cyclohexanol, benzylalcohol, terpineol and furfurylalcohol. These alcohols will be present in the dispersion in an amount ranging from 2–80% by weight, preferably 3–50%, more preferably 5–40%.

The emulsion according to the present invention will normally contain one or more surface active agents, i.e. solubilizers, surfactants and/or dispersants which assist in forming and stabilizing the emulsion droplets. Such solubilizers, surfactants and/or dispersants will be chosen according to the nature of the emulsion, and can be nonionic, anionic and/or cationic. The surface active agent will normally be present in an amount ranging from 0.1 to 99% by weight, preferably 0.2 to 33%. Below is set forth a non-exhaustive list of suitable solubilizers, surfactants and dispersants:
I. Non-ionic surfactants including ethoxylated or ethoxylated and propoxylated [alkylphenols, di- or tristyrylphenols, oils (e.g. castor oils), oleic acids, fatty or synthetic alcohols, fatty or synthetic amines or amides]; ethoxylated or ethoxylated and propoxylated sugar esters (e.g. sorbitan monolaurate, POP-POE glycerol sorbitan fatty esters) of e.g. (ethoxylated) oleic or fatty acids; sucroglycerides; ethoxylated sugar ethers (e.g. alkyl polyglucoside);

silicone surfactants (e.g. silicone glycol copolymers with polyoxyalkylene polymethylsiloxane units; acetylenic diols (e.g. 2,4,7,9-tetramethyl-5-decyn-4,7-diol);

II. Anionic surfactants including alkylarene sulphonates (eg. dodecylbenzenesulfonates); alkyldiphenyl ether sulfonate salts; sulfosuccinates (eg. dioctyl sulfosuccinates); (ethoxylated) alkyl sulfates (e.g. lauryl sulfates, lauryl ether sulphates); (fluorinated) mono-, di- and/or triesters of phosphorous acid and salts thereof (as alcohols may be used e.g. (ethoxylated) alkyl-, di- or tristyrylphenols, alkanols such as $C_nH_m$-OH with $8 \leq \text{total } C \leq 18$, 2-ethylhexyl- or lauryl alcohol); ethoxylated di- or tristyrylphenol sulfates.

III. Cationic surfactants including protonated (ethoxylated) primary, sec., or tert. amines or diamines; (ethoxylated) quaternary ammonium salts (e.g. trimethyl oleyl ammonium chloride)

IV. Amphoteric surfactants including N-coco-beta-aminobutyric acid; amine oxides.

V. Polymeric surfactants like polyethylene oxide/polypropylene oxide copolymers; acrylic polymers; polyvinyl alcohol; modified polyesters; starch; graft polymers VI. Solubilizers including naphtalene sulfonate; cumol sulfonate.

VII. Dispersants including phenylsulfonates; (alkyl-) naphtalene sulfonates; polycarboxylates; acrylic polymers; maleic acid/acrylic acid coploymers; maleic acid/methyl vinyl ether copolymers; polyvinyl pyrrolidone; polyvinyl pyrrolidone/polystyrene copolymers; (ethoxylated) lignin sulfonates.

Prior to seeding, it is desirable that the supersaturated emulsion contains no seed crystals of substances apart from those that are intended to be seeded. Any seeds present can be dissolved by ultrasound or heating, such dissolving of seeds in the supersaturated emulsion hereinafter referred to as "homogenisation".

Seeding with seed crystals of the desired substance and seed crystals of at least one other substance in the aggregate mixture can be carried out simultaneously or consecutively. Simultaneous seeding is possible where a separation of the resulting mixture of different crystalline substances can be performed effectively in a subsequent step by one of the methods described below.

Seeding may take place by various methods. The seed crystals may be selected according to quantity, size, habitus and crystal modification. Selecting seed crystals of the desired substance that differ in size or in quantity from the seed crystals of the other substance(s) will facilitate separation of the crystals of the desired substance from the crystals of the other substance(s).

The seed crystals may also constitute mixtures of different modifications, habitus, size, in different quantities. They may be finely ground or may also be pregrown to a certain size. They may be added individually or as a pre-mix, and as a powder, or preferably, as a suspension.

The seed crystal of the desired substance may be a co-crystal or a salt of the desired substance to thereby effect crystallisation of a co-crystal or a salt of the desired substance. co-crystal, which thereby effects crystallisation of a co-crystal.

During seeding, it is usually desirable to inhibit crystallisation of non-seeded species, which may be caused by primary or secondary nucleation.

Primary nucleation can be inhibited by a proper degree of supersaturation, by a proper choice and amount of crystallisation inhibitors, surfactants and solvents, by choice of temperatures, viscosities and agitation. Secondary nucleation can be inhibited by proper, gentle agitation and also by growing selectively more compact crystal forms, which do not have a strong tendency to break into pieces.

The crystal growth rate can be optimised by adjusting the usual parameters, e.g. the degree of supersaturation, the solubility of the crystallising substance(s) in the continuous phase (which can be controlled by a proper choice of solvents, surfactants and additives), and the microenvironment adsorbed to the crystal surface (e.g. surfactants, dispersants, polymers which may serve as a retarding layer, or may displace improperly adsorbed molecules).

This crystallisation process can be performed at an optimum temperature within wide limits (e.g. $-20°$ C. to $+80°$ C.). Preferably the temperature of the dispersion is kept constant. The additives previously mentioned may also serve as antifreeze agents.

This crystallisation process can further be optimised by a proper agitation during the crystallisation (e.g. by stirring, shaking, pumping and/or ultrasound).

After the crystallisation is complete, the crystals can be obtained by simple filtration and subsequent thorough washing with a solvent e.g. similar to or the same as the solvent used in the continuous phase. For example, crystals from an o/w emulsion may be washed with water, whereas crystals from a w/o emulsion may be washed with oil to remove residual emulsion, surfactant, dispersant, solvent etc. The solvent may further contain additional surfactant or dispersant to aid complete re-dispersion of the crystalline precipitate in the washing liquid, thus making the washing process more efficient.

Various embodiments of the emulsion system of this invention are contemplated. The emulsion may be a "oil-in-water" (o/w) or a "water-in-oil" (w/o) emulsion. "Oil" as used herein refers to a poorly water soluble solvent e.g. any of the poorly watersoluble solvents that have been previously mentioned in this application. O/w and w/o emulsions and methods for forming them are per se known in the art. The aggregate mixture may be conveniently combined with one or more non-polar, amphiphilic or polar solvents such as those previously mentioned to form a supersaturated solution of the aggregate mixture, or the aggregate mixture may, itself, be the droplets.

Consecutive Seeding

In a most basic form, consecutive seeding in an emulsion crystallisation according to the present invention is carried out following these steps:

(1) seeding the emulsion with crystals of the desired substance to effect crystallisation of the desired substance and removing the resulting crystals; and (2) seeding the emulsion remaining after step (1) with seed crystals of the other substance(s) to effect crystallisation of the other substance(s), and removing the resulting crystals.

Where there is a third or further substance to be separated from the aggregate mixture, a third or further step is added, each step being carried out like step (1) or (2), but for use of a different seeding species. Through this procedure, it is possible to separate previously difficult or impossible to separate mixtures (e.g. racemic mixtures) at very high overall yield at very high purity and at very reasonable cost.

In most cases it will be necessary to homogenise the supersaturated emulsion prior to seeding.

Figure 2:
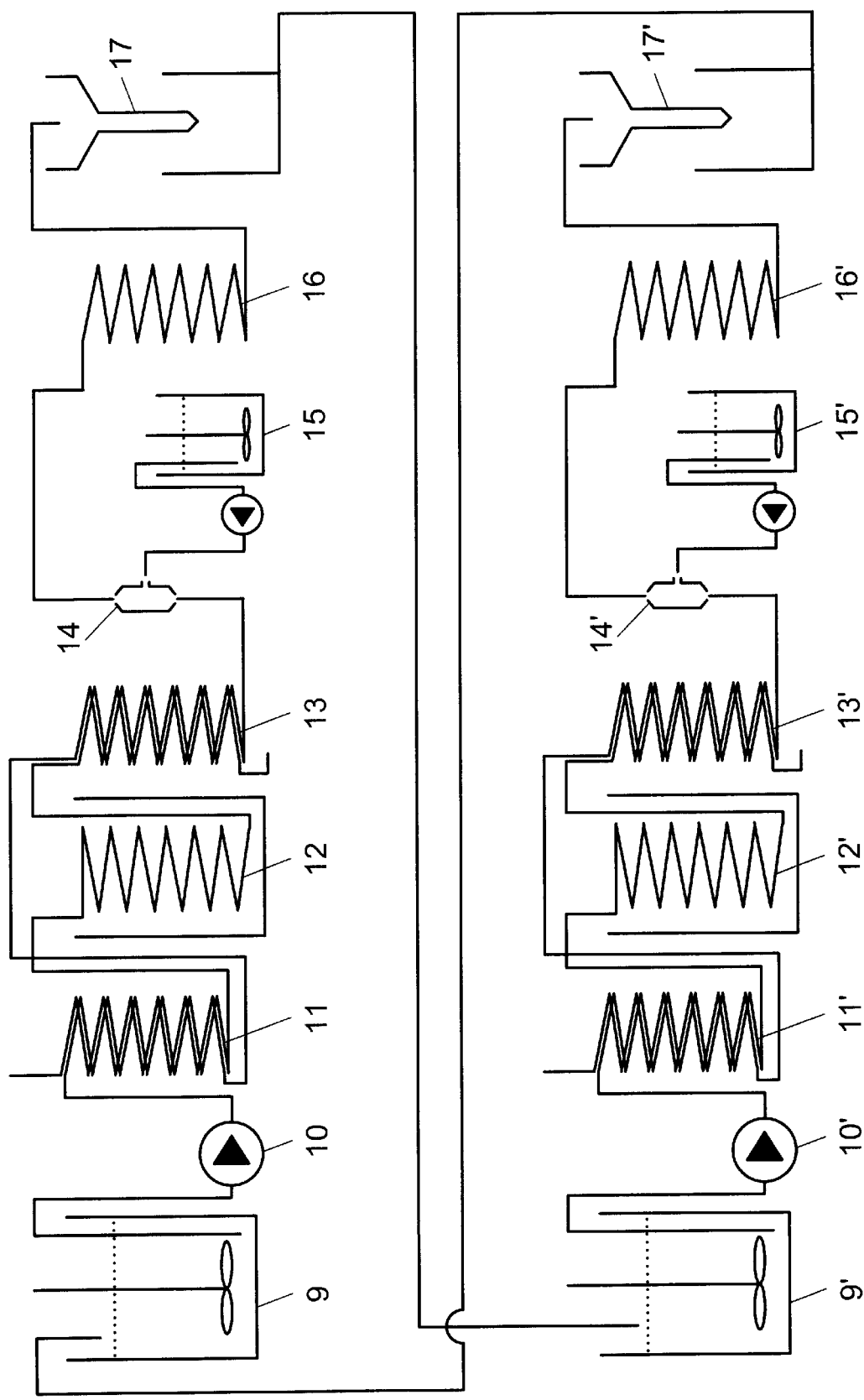
FIG. 2 shows a procedure for carrying out the process of the present invention continuously and with consecutive seeding.

Consecutive seeding is most efficiently carried out by running the steps described above simultaneously and in parallel. To do this, emulsion remaining after step (2) is used as the emulsion in step (1), whilst emulsion remaining after step (1) is used as the emulsion in step (2). These steps may be carried out batch-wise, as shown in FIG. 1, or continuously, as shown in FIG. 2. If there is a third step in the process for separating a third substance from the aggregate mixture, the emulsion remaining after the third step will be used as the emulsion for step (1).

Likewise a suitable consecutive seeding sequence for removing four substances from an aggregate mixture would be:

(1) seeding the emulsion with crystals of the desired substance to effect crystallisation of the desired substance and removing the resulting crystals; (2) seeding the emulsion remaining after step (1) with seed crystals of a second substance to effect crystallisation of the second substance, and removing the resulting crystals; (3) seeding the emulsion remaining after step (2) with seed crystals of a third substance to effect crystallisation of the third substance; (4) seeding the emulsion remaining after step (3) with seed crystals of a fourth substance to effect crystallisation of the fourth substance; and using the emulsion remaining after step (4) as the emulsion in step (1).

Of course, this process can be extended in a parallel fashion if more than four substances are to be separated from the aggregate mixture. Also, the order of the steps can be arranged as desired; it is only important that after one iteration of all steps, "remaining emulsion" will have removed from it at least a portion of each of the seeded substances.

Simultaneous Seeding:

As previously mentioned, simultaneous seeding is possible where a separation of the resulting mixture of different crystalline substances can be performed effectively in a subsequent step by one of the methods described below. Simultaneous seeding is especially appropriate in a number of situations, including 1. where a second component being crystallised simultaneously with the desired substance contributes significantly to the solubility of the desired substance in the droplet; or
2. where, even after long residence times, there is a minimum amount of spontaneous growth of mixed crystals of desired and other substances (e.g. racemic crystals), and thus the emulsion can be recharged numerous times before a homogenisation step is necessary; or
3. where the spontaneous nucleation of other substances is difficult to inhibit completely, especially after the aggregate mixture has already been depleted to a certain degree of the desired substance; or
4. where crystallisations are carried out in emulsions with only a low volume fraction of droplets.

In some cases, it will be desirable to crystallise all substances of the aggregate mixture. Some of the substances may be present in the aggregate mixture in concentrations below saturation. In this case, added seed crystals will simply dissolve. When however the mixture is sufficiently depleted of the other substances by a simultaneous emulsion crystallisation process, then the concentration of the below saturation substances may reach a supersaturated level. At this point in the process, these substances can also be crystallised by seeding, i.e. seed crystals of these substances simply must be added later in the simultaneous emulsion crystallisation process. It may also occur that upon depletion of one or more other present substances a further component may start to crystallise spontaneously. Also, the concentration of some minor components of the aggregate mixture may only be sufficiently increased after recharging and crystallizing the main components (several times). Then, only after these initial crystallization steps, seed crystals of the minor component are added.

Especially in cases when emulsions with little or no solvent are used and virtually all components of the aggregate mixture are removed by crystallization, then the emulsion droplets disappear completely, leaving a mixture of individual crystals consisting of the pure substances. Since the solubility in the continuous phase and also micellar solubility due to present surfactants and dispersants is normally low, very high yields of the desired substance(s) as pure crystals can be reached in one crystallisation step. The more complete the substances of the droplets can be crystallised out by seeding most or all substance(s), the more often the emulsion can be re-used by recharging with aggregate mixture, crystallizing, recharging, etc. This leads to higher total yield of the desired substance, and minimised loss of the constituents of the emulsion (i.e. surfactants, solvents etc.).

Subsequent Separation of the Different Crystal Species

Following simultaneous crystallisation, the desired crystalline component of the mixture of individual crystals has to be separated from the other crystalline component(s). Several methods can be used to achieve this:

A. separation by Sieving

By seeding with uniform seed crystals of one size of the desired component and uniform seed crystals of a different size of all other substances, or by seeding with a certain quantity of seed crystals of the desired component and a greatly different quantity (e.g. 10 to 100-fold) of seed crystals of all other substances, crystal size of the desired substance will differ sufficiently from crystal size of the other substances to allow separation by a simple sieving process using a sieve with a defined pore size, which lets the fine crystals of the one component pass and withholds the big crystals of the other component. Build up of a thick crystal layer should be avoided along the relevant sieving surface, because such thick crystal layer might serve as a sieve by itself with a non-defined pore size, which might retain also the small particles. Therefore, crossflow sieving techniques or a sieving process with immediate and thorough rinsing with e.g. filtrated mother liquor are preferred. Preferably the sieving process is performed at the crystallisation temperature in order to avoid re-melting together of the individual crystals at higher temperatures. By a second sieving or filtration step all fine crystals of the other substances are sieved or filtered off the emulsion. In order to remove all small crystals the retained large crystal fraction is washed thoroughly with emulsion from the crystallisation process, which has passed a fine-filtration step or, in the case of an o/w emulsion, with water, which may contain an additional surfactant.

Residual emulsion is preferably washed away from the crystals after the sieving step. It is however important that any crude containing emulsion is washed away thoroughly, since otherwise the crude will contaminate the pure crystals again. This is effected best by adding a proper dispersant or surfactant to the washing liquid, e.g. water. Care should also be taken that residual emulsion does not dry on the crystal's surface, because upon drying the emulsion will break and the aggregate mixture precipitated on the crystal surface cannot be washed away easily.

B. Separation by Selective Sedimentation, Centrifugation or flotation

If the different crystalline species show a substantial difference in density, size or shape, or if their surface adsorption properties are substantially different, the different crystals can also be separated by a batch-wise or continuous sedimentation, centrifugation or flotation process. In this case, seed crystals of significant difference in size or seed crystal modifications growing fast in only one or two dimensions may be employed.

C. Separation by Selectively Melting the Different Crystalline Species in Suspension The separation of a crystal conglomerate obtained by simultaneous seeding with two or more substances of the mixture can also be achieved by a selective melting and subsequent sieving or oiling out of the molten crystal species, if the melting points of the different crystalline substances differ substantially (e.g. >10° C. difference). To achieve this, all crystal species are advantageously first filtered from the emulsion and any residual emulsion is washed away completely. Then the wet crystal cake is re-suspended in a solvent in which the substances are substantially insoluble (e.g. water for organic molecules), optionally using proper dispersants and/or surfactants to obtain preferably a dilute suspension (e.g. 0.001 to 20% w/w). This suspension is then heated up quickly to the melting point of the lower melting crystal species. Thereby this fraction will melt and will form oil droplets. These droplets may be filtered away in an immediately following filtration step (e.g. by cross flow filtration or by a belt filter such that the newly formed droplets do not have to pass through a built up crystal layer).

These freshly formed droplets may also undergo quick coalescence and oil out, i.e. a liquid organic phase separates from the suspension. The oiling out process may be accelerated by providing a large surface onto which the oil droplets may oil out, by keeping the distance short between any volume fraction of the dispersion, from where a freshly formed oil droplet has to travel to reach the next surface and/or by applying centrifugation force.

Molten crystals should be separated quickly from the non-molten substances. Otherwise the oil droplets have a chance to re-saturate themselves with the other substances until complete equilibrium is reached. This can only be avoided or minimised by keeping the solubility of the substances in the continuous phase low and by keeping the time between heating up, melting and removing the oil as short as possible, e.g. by passing the suspension through a thin hose in a heating bath with approx. the targeted temperature with a filtration unit immediately following. By the diameter of the pipe, the flow rate of the suspension and the temperature of the water bath then the heating up and melting time and the time until finally separating oil droplets and crystals by filtration or oiling out can be optimised.

This separation step may be repeated for as many of the other present substances as desired by heating to their respective melting points.

It is important that crystallisation conditions are employed under which the different crystal species grow as single, non-agglomerated crystals. Otherwise a separation by sieving out different sizes or a separation by selective sedimentation, centrifugation or flotation and also a separation by selectively melting and filtering or oiling out the lower melting can be difficult. Such single crystals can be obtained by emulsion crystallisation under optimised temperature and supersaturation conditions with proper amounts of surfactants and/or dispersants present. It may be furthermore essential, that the droplet volume fraction is kept low (e.g. 0.01–20%, preferably 0.12% 2% of the emulsion) to obtain very regularly shaped single crystals.

As a general matter, in both simultaneous and consecutive seeding according to the present invention, the emulsion remaining following removal of the desired and/or other crystals can be re-charged with emulsion and/or aggregate mixture. The remaining emulsion is in this way effectively recycled, which generally leads to less waste and better overall yields of crystals.

The separation process of the present invention may be carried out as a batch process or a continuous process. Several embodiments for carrying out the process batch-wise and continuously are illustrated in the Figures.

EXAMPLES

Example 1

Consecutive Seeding—Enantioselective Emulsion Co-crystallisation of (BNA)*(NMP) in a Batch Process (with Reference to FIG. 1)

A 220 liter (1) container 1 is filled with a suspension-emulsion (suspoemulsion) formed from approx. 150 l of an emulsion of approx. 10% w/w isobutanol, 10% w/w N-methylpyrrolidone, 20% w/w N-ethylpyrrolidone (each of which serve as a solvent in the droplets), 20% w/w SYNPERONIC NP 10 (a nonylphenol ethoxylated with 10 mol % ethyleneoxide which serves as a surfactant) and 40% w/w water, to which 150–220 g/l (22.5–30 kg) racemic 1,1'-bi-2-naphthol (BNA) and an equimolar quantity of N-methylpyrrolidone i.e. 7.8 kg are added. The suspoemulsion is stirred in container 1 with a dispersing device to achieve a homogeneous fine dispersion of (BNA)*(NMP) co-crystals. The suspoemulsion is pumped by pump 2 at a pressure of approx. 2 bar through a pre-heater 3 consisting of a 100 m long TEFLON tube (i.d. 10 mm, o.d. 12 mm) inside a second polyethylene tube (i.d. 18 mm, o.d. 22 mm) to heat the suspoemulsion from room temperature (r.t.) to approx. 50–75° C. The pre-warmed suspoemulsion is then pumped through a "homogenisator" 4 consisting of a 200 m long TEFLON tube (i.d. 10 mm, o.d. 12 mm) in a 220 l drum (diameter 57 cm, height 91 cm), filled with water which is heated by two electrical heaters of 4.5 and 7.5 kW to 95–100° C. After passage through homogenisator 4, the suspoemulsion becomes an emulsion, since all solid BNA-crystals and any other seeds for crystallisation of BNA are dissolved. The emulsion is cooled to 25–35° C. in cooler 5, yielding a highly supersaturated emulsion. Cooling is achieved with tap water running counter-currently in cooler 5, consisting of an identical structure to that of preheater 2. The cooling water, now heated to 60–85° C., is used as heating medium for preheater 1, which is, itself, running counter-currently.

30 l of cooled, highly supersaturated emulsion is filled into carefully cleaned 30 l polyethylene bottles 6, which are preferably charged before use with approx. 30 ml of isobutanol. This serves to wet the entire inside surface to dissolve any possible seed germs, and also to saturate the air in the bottle completely with isobutanol. In this way, evaporation of isobutanol from the emulsion surface can be minimised or avoided completely, thereby preventing undesired spontaneous crystallisation. During the filling operation, access of air to any emulsion surface is minimised by sealing the bottle with a screw cap having a filling pipe mounted to it with only a fine hole open for the displaced air to escape. After the bottle has been filled (15–30 min), the thus generated homogenised, highly supersaturated microemulsion at 25–35° C. shows little or no spontaneous crystallisation for more than 30 min even upon moderate agitation. e.g. rolling of the sealed drums on rolling device 7. Next, approx. 200 ml of a suspension of (RBNA)*(NMP)seed-crystals is added to the micro emulsion. This seed suspension consists of approx. 420 g humid (RBNA)*(NMP)

co-crystals in an emulsion of 3 kg SYNPERONIC NP 10, 2 kg isobutanol, 2 kg, N-methylpyrrolidone and 13 kg water. This mixture is finely ground in a glass bead mill. The bottle with the seeded emulsion is then sealed with a screw cap, placed on rolling device 7 and rolled at about 30 rpm for approx. 30 min.

Then, the 30 l suspoemulsion with the grown crystals are sieved through a stocking, sieve 8 of dimensions approx. 1 m long, approx. 9.5 cm diameter, 27μ pore size or by filter suction e.g. through a Buchner funnel. Residual emulsion is squeezed from the resulting wet crystal cake of (RBNA)*(NP). The sieving operation should be carried out quickly—e.g. in approx. 30–90 seconds, and contact of unsieved suspoemulsion with air minimised to avoid induction of spontaneous nucleation of racemic (BNA)*(NMP). Such germs would need approx. 2–5 min. to grow to a size, that could be retained by the sieve.

The crystal cake of (R-BNA)*(NMP) is washed 1–2 times, i.e. re-dispersed in approx. 2–3 l of water and filtered again through a 27μ sieve. The resulting humid material consists of approx. 90–100% (R-BNA)*(NMP) and 10–0% (S-BNA)*(NMP). Thus approx. 10–50 g/l of (R-BNA)*(NMP) are received, corresponding to approx. 400–2000 g humid cake per 30 l bottle.

For further purification, the wet cake may be re-crystallised from isobutanol by heating a suspension of approx. 38 kg of wet cake of (R-BNA)*) (approx. 95%) in approx. 60 l of a mixture of 95% isobutanol and 5% NMP up to 60–80° C., letting it cool to r.t. upon moderate stirring and after filtration washing the crystal cake in cold isobutanol, resulting in approx. 18 kg (RBNA)*(NMP) [R-BNA: S-BNA>99.9: 0.1].

The NMP is removed from the (RBNA)*(NP) co-crystal by heating approx. 3 kg of (RBNA)*(NMP) with approx. 30 l of water up to 90° C. and stirring for 90 min. After filtration and drying,, R-BNA with a chemical purity of>99% and an enantiomerical purity of>99% is obtained.

As shown in FIG. 1, parallel to the operation of the first line, an identically constructed and operated second line (with 1' corresponding to 1 of FIG. 1, 2' to 2, etc.) is run simultaneously, starting also with approx. 150 l of the above described emulsion, charged also with 150–200 g/l racemic BNA. In this case, however, the supersaturated, homogenised and cooled to crystallisation temperature emulsion is seeded with finely ground (S-BNA)*(NMP) seed crystals. Filtration and washing of the (S-BNA)*(NMP), and removal of NMP from (S-BNA)*(NMP) co-crystals is carried out in the same way as previously described for (R-BNA)*(NNP) co-crystals.

Following this first iteration, filtrate which is depleted of (R-BNA)*(NMP) from the first line is supplemented with an amount of racemic (BNA)*(NMP) co-crystals corresponding to the amount of (RBNA)*(NMP) co-crystals depleted, and is added to the starting suspoemulsion in container 1'. Likewise, filtrate which is depleted of (S-BNA)*(NMP) from the second line is supplemented with an amount of racemic (BNA)*(NMP) co-crystals corresponding to the amount of (S-BNA)*(NMP) co-crystals depleted, and is added to the starting suspoemulsion in container 1.

By carrying out this process through multiple iterations, more than 100 kg of S-BNA and 100 kg of R-BNA can be separated from 300 l of starting suspoemulsion. Only the loss of emulsion carried out with the crystal cake of (R-BNA)*(NMP) and (S-BNA)*(NMP) has to be minimised by complete removal of emulsion from the cake and also must be compensated by addition of fresh emulsion.

Example 2

Enantioselective Continuous Emulsion Crystallisation of (BNA)*(NMP) (with Reference to FIG. 2)

The procedure of Example 1 is followed using containers 9, 9', pumps 10, 10', preheaters 11, 11', homogenisators 12, 12', coolers 13, 13' until the step in which the bottles (6, 6' of FIG. 1) are filled. In place of filling the bottles, supersaturated, homogenised and re-cooled emulsion is pumped through a 324 m long crystal growth pipe 16, 16' of 14 mm i.d., 18 mm o.d. and made of TEFLON at approx. 25–30° C. at a rate of approx. 100 l/h. At seed crystal injection points 14, 14', a suspension of (R-BNA)*(NMP) and of (S-BNA)*(NMP)-seed-crystals, respectively, are continuously injected from containers 15, 15' l at a rate of 200 ml/30 l emulsion. A static or dynamic in line mixing device may be put in place after the seed crystal injection point. The flow and the length of the crystal growth pipe are adapted such that a crystal growth time of approx. 20–30 min. results. After passage through the crystal growth pipe, the suspoemulsion is sieved (e.g. continuously by filter suction), applying the same principles as mentioned before, i.e. inhibiting contact with air and keeping the filtration time as short as possible. In this way the manual work for handling the individual bottles can be avoided.

From time to time spontaneous nucleation may occur, leading to rapidly growing racemic BNA-crystals, which may then eventually stick somewhere at the wall of the crystal growth pipe and contaminate the supersaturated emulsion passing by. These "racemate ulcers" may even eventually block the whole pipe. Therefore it will be necessary to re-dissolve all crystalline matter and to re-homogenise the supersaturated emulsion in the crystal growth pipe in case of appearance of racemate growth or in periodic time intervals by heating the pipe—e.g. with a heating pipe, inside of which the crystal growth pipe is installed, by a hot heating liquid tank, into which the crystal growth pipe can be immersed or by applying ultrasound to the walls of the crystal growth pipe. Alternatively a solvent or hot emulsion may be pumped through the crystal growth pipe. Only after the crystal growth pipe has been completely re-homogenised selective seeding of the supersaturated emulsion will yield the desired crystals in good purity again.

What is claimed is:

1. A crystallization process for separating a substance to be separated from an aggregate mixture, in which process a liquid in liquid emulsion of droplets in a continuous phase containing the aggregate mixture is formed and supersaturated, wherein the emulsion is seeded with seed crystals of the substance to be separated and seed crystals of at least one other substance in the aggregate mixture to effect crystallization of the substance to be separated and said at least one other substance in the continuous phase.

2. The process of claim 1 wherein at least 30% by weight of the aggregate mixture is contained in the droplets.

3. The process of claim 1 wherein the seed crystals of the substance to be separated and seed crystals of said at least one other substance are seeded simultaneously.

4. The process of claim 3 wherein the seed crystals of the substance to be separated differ in size or in quantity from the seed crystals of said at least one other substance to facilitate separation of any crystals of the substance to be separated resulting from the process from any crystals of said at least one other substance resulting from the process.

5. The process of claim 1 wherein any crystals of the substance to be separated resulting from said process are separated from the crystals of said at least one other substance by sieving or melting or sedimentation.

6. The process of claim 1 wherein the seed crystals of the substance to be separated and of said at least one other substance are seeded consecutively.

7. The process of claim 6 comprising the steps of
   (1) seeding the emulsion with crystals of the substance to be separated to effect crystallization thereof and removing its resulting crystals; and
   (2) seeding the emulsion remaining after step (1) with seed crystals of said at least one other substance to effect crystallization of said at least one other substance, and removing the resulting crystals.

8. The process of claim 7 wherein emulsion remaining after step (2) is used as the emulsion in step (1).

9. The process of claim 7 wherein the emulsion remaining after step (1) and/or step (2) is re-charged with emulsion and/or aggregate mixture prior to seeding.

10. The process of claim 1 wherein the emulsion is homogenised prior to seeding.

11. A process according to claim 1 wherein the seed crystal of the substance to be separated is a co-crystal or a salt of said substance to be separated to thereby effect crystallization of a co-crystal or a salt of said substance to be separated.

* * * * *